United States Patent [19]

Hatter

[11] Patent Number: 4,756,652
[45] Date of Patent: Jul. 12, 1988

[54] THREADED NUT RESISTANT TO REMOVAL

[75] Inventor: Edwin E. Hatter, Torrance, Calif.

[73] Assignee: Hi-Shear Corporation, Torrance, Calif.

[21] Appl. No.: 825,867

[22] Filed: Feb. 4, 1986

[51] Int. Cl.⁴ .................. F16B 31/00; F16B 41/00
[52] U.S. Cl. ........................... 411/5; 411/430; 411/432; 411/910
[58] Field of Search ...................... 411/1-8, 411/429-431, 910, 432; 70/231

[56] References Cited

U.S. PATENT DOCUMENTS

| | | |
|---|---|---|
| 1,696,523 | 12/1928 | Cochran .................. 411/5 |
| 2,823,725 | 2/1958 | Trinca .................. 70/231 |
| 3,444,775 | 5/1969 | Hills .................. 411/3 |
| 3,561,820 | 2/1971 | Chaivre .................. 411/430 |
| 3,978,761 | 9/1976 | Sosinski .................. 411/5 |
| 4,225,165 | 9/1980 | Kesselman .................. 411/910 |
| 4,302,137 | 11/1981 | Hart .................. 411/910 |
| 4,521,146 | 6/1985 | Wharton .................. 411/1 |

Primary Examiner—Neill Wilson
Attorney, Agent, or Firm—Donald D. Mon

[57] ABSTRACT

A security fastener has a threaded body with tool engaging surfaces. It is surrounded by a freely rotatable spinner. When the fastener is tightened down the tool engaging surfaces are removed so there is nothing on the fastener to be engaged by a tool. The side of the fastener is shielded by the rotatable spinner.

1 Claim, 1 Drawing Sheet

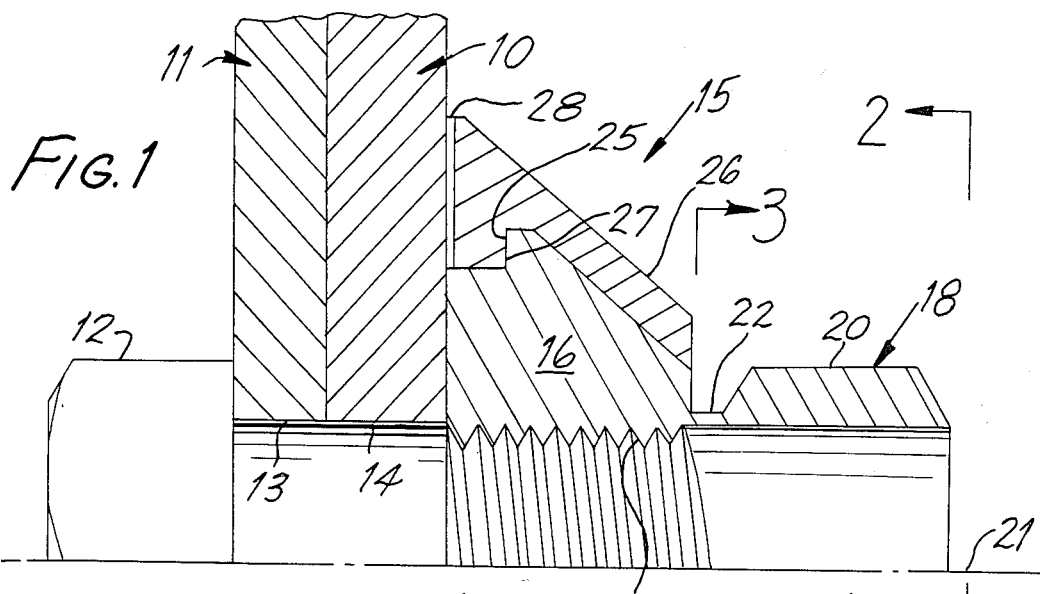
Fig.1
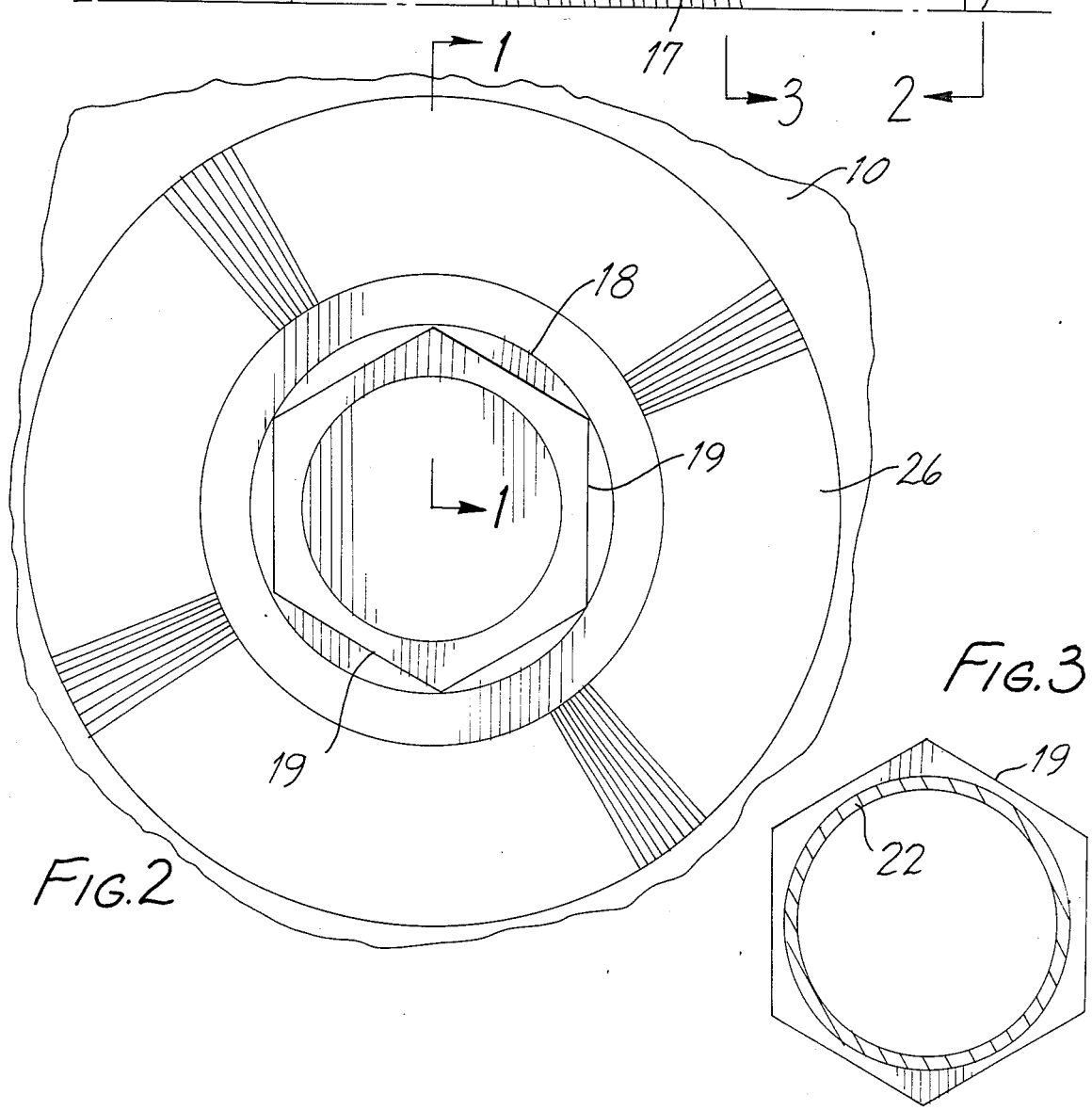
Fig.2
Fig.3

THREADED NUT RESISTANT TO REMOVAL

FIELD OF INVENTION

This invention relates to security fastener, which once installed cannot be removed without destructive deformation of the fastener.

BACKGROUND OF THE INVENTION

Security nuts have as their objective to provide no convenient grip by means of which they can be removed. Removal can then be attained only by destruction or deformation. Thieves must work quickly, and means which require excessive time, or substantial tools to overcome a security feature will generally discourage a thief. Thus, it is not necessary that a security nut be absolutely non-removable, because often they later will need to be removed in order to replace or service the article they are protecting. Time-consuming inconvenience is generally sufficient.

Security nuts which are shaped so a wrench cannot get a grip on them, or which spin freely even if a grip can be attained, are known. For example, Gassaway U.S. Pat. No. 3,910,079 shows a bolt whose head is protected from access by an attached free-spinning cap which is also tapered so as to provide no gripping surface for a wrench. Access to the bolt can be attained only by removing a locked plug from the cap. The Gassaway device retains the capacity to engage the bolt with a tool, but shields the tool-engaging surfaces by means of a locked plug.

Such a device has the feature that tool-engaging surfaces do remain in existence, so that if the lock is overcome or released then the article can conveniently be removed. Of course in some installations this is considered to be an advantage, rather than a disadvantage.

A total absence of tool engaging surface will result in a less convenient but more secure device, because then a destruction or severe deformation of the fastener must always be accomplished, which takes time and strong tools. It is an object of this invention to provide such a device.

BRIEF DESCRIPTION OF THE INVENTION

A security fastener according to this invention has a threaded body intended to be joined relative to another to form a tight joiner. This body may be an internally threaded nut or an externally threaded bolt. A spinner is mounted to this body so as to surround it. The spinner is freely rotatable relative to the body, but is held to it so it cannot be removed, except destructively.

Tool-engaging means on the body project through a central opening in the spinner. They are engageable to tighten the fastener, and removable so there are no tool-engaging surfaces on the fastener at all. Thus, no means needs to be provided to protect the end of the fastener from tool engagement—there is access to the end of the fastener, but nothing is there to be engaged. The fastener can be removed only by destructively removing the spinner or by drilling or broaching operations, any of which takes time, energy and tooling.

According to a preferred but optional feature of the invention, the tool-engaged surfaces are disposed on a stub which can be torqued off of the body, or cut from the body.

The above and other features of this invention will be fully understood from the following detailed description and the accompanying drawings, in which:

BRIEF DESCRIPTION OF THE DRAWINGS

FIG. 1 is an axial half-section of the presently preferred embodiment of the invention, and FIGS. 2 and 3 are cross sections taken at lines 2—2 and 3—3 respectively, in FIG. 1.

DETAILED DESCRIPTION OF THE INVENTION

An article 10 such as an automobile bumper is shown being held to underlying structure 11 such as the frame of an automobile. A threaded bolt 12 passes through holes 13, 14 in the article, and is joined to a security fastener 15 according to the invention.

In the embodiment shown, the fastener is a nut having a body 16 with an internal thread 17. It is engaged to the bolt thread and tightened down to hold the article in place. For this purpose, the body includes tool-engaging means 18, in the drawings a hexagonal array of surfaces 19.

The tool engaging means are formed on a stub 20 intergral with the body and extending axially along central axis 21. A neck 22 comprising a region of minimum cross-section is proportioned so as to fracture there at some predetermined torque which is sufficiently high to enable the nut to be properly tightened. If inherent torque off is not desired, the stubs can be formed with greater cross section area, and perhaps made solid rather than hollow. Then it can merely be cut off or chiseled off after the nut is tightened down. In either event, no tool engaging means remains after the stub is removed.

Body 16 of the nut is generally circular and has a peripheral flange 25. A spinner 26 has an internal flange 27 which overhangs flange 25. Its thickness is such that a spacing 28 exists between the article and flange 27 after the nut is installed. The spinner is circular in cross section and has a smooth, tapered outer surface 29. Its inner surfaces and those of the body adjacent to it are also smooth and circularly sectioned. Thus the spinner can turn freely on the nut. The tapered part of the spinner can be formed by a swaging operation, when the spinner is assembled to the nut body. It terminates axially in near adjacency to the end of the body, and neck 21 is immediately adjacent to the ends of the tapered surface of both the body and the spinner.

It can readily be seen that what has been described as a nut body could instead have been the head of a bolt or screw, with the same functions and advantages.

Thus the fastener is set by driving its tool-engaging surfaces, and then they are removed. Thereafter, there are no means to engage a tool from the end. The wall of the fastener body is protected by the spinner, because even if a tool gets a grip on it, it merely turns freely. The tapered shape frustrates even that.

Removal can be attained only by destructively removing the spinner, or somehow otherwise deforming the body so a tool can engage it.

This invention is not to be limited by the embodiment shown in the drawings and described in the description, which are given by way of example and not of limitation, but only in accordance with the scope of the appended claims.

I claim:

1. A threaded nut resistant to removal, adapted to be threaded onto the threaded end of a shank, and brought into abutment with a surface on a body from and beyond which said threaded end projects, said nut comprising: a body having a bearing face, an internally threaded passage opening through said bearing face, said bearing face being adapted to bear against said surface, said body also having a retention face axially spaced from the bearing face, said body also having an exterior torqued surface narrowing in its direction away from the bearing face;

a spinner having an exterior surface of revolution and a shoulder overlaying each of said faces so as to retain said spinner to said body against axial removal and to permit the spinner to spin freely around said body, said surface of revolution being tapered, the axial length of said spinner being such that at the end having the bearing face, the spinner is relieved from said bearing face sufficiently that when said bearing face bears against said surface, there is no impediment to the free rotation of the spinner, said spinner shrouding said body so as to prevent direct access to it;

said body further having an axially extending tubular stub which bears tool-engaging surfaces, and having a region of least resistance to torque immediately adjacent to the end of the torqued surfaces of the body and of the spinner; whereby when a predetermined torque is exerted thereon, the stub torques off, and leaves the nut set at said predetermined torque, said stub passing axially through said spinner with the remaining nut body fully and closely embraced by the spinner.

* * * * *